United States Patent
Centonza et al.

(10) Patent No.: US 9,485,691 B2
(45) Date of Patent: Nov. 1, 2016

(54) METHODS FOR MOBILITY THRESHOLD SIGNALING

(71) Applicant: Telefonaktiebolaget L M Ericsson (publ), Stockholm (SE)

(72) Inventors: Angelo Centonza, Winchester (GB); Stefan Engström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/441,539

(22) PCT Filed: Jun. 28, 2013

(86) PCT No.: PCT/SE2013/050824
§ 371 (c)(1),
(2) Date: May 8, 2015

(87) PCT Pub. No.: WO2014/077757
PCT Pub. Date: May 22, 2014

(65) Prior Publication Data
US 2015/0312816 A1    Oct. 29, 2015

Related U.S. Application Data

(60) Provisional application No. 61/726,422, filed on Nov. 14, 2012.

(51) Int. Cl.
*H04W 36/00* (2009.01)
*H04W 28/18* (2009.01)
*H04W 92/20* (2009.01)

(52) U.S. Cl.
CPC ......... *H04W 36/0083* (2013.01); *H04W 28/18* (2013.01); *H04W 92/20* (2013.01)

(58) Field of Classification Search
CPC  H04W 36/0083; H04W 28/18; H04W 92/20

USPC ................................................. 455/436–453
See application file for complete search history.

(56) References Cited

U.S. PATENT DOCUMENTS

2013/0040692 A1* 2/2013 Chen .................... H04W 36/04
455/525
2015/0181481 A1* 6/2015 Masini .............. H04W 36/0083
455/436

(Continued)

FOREIGN PATENT DOCUMENTS

WO    2012044372 A1    4/2012
WO    WO 2012044372 A1 *  4/2012    ........ H04W 36/0005

OTHER PUBLICATIONS

ZTE, "The enhancement of the mobility settings negotiation", 3GPP TSG RAN WG2#69, Madrid, Spain, Aug. 23, 2010, pp. 1-2, R3-102162, 3GPP.

(Continued)

*Primary Examiner* — Sharad Rampuria
(74) *Attorney, Agent, or Firm* — Coats & Bennett, PLLC (57) ABSTRACT

An apparatus and method for communicating mobility threshold changes between peer nodes (12a, 12b) in a communications network (10) is provided. A sending peer node (12a), such as an eNB, for example, generates (104) a mobility change request message (40) to include an information element (50) having a set of mobility parameters. The set of mobility parameters includes a change value (52) that indicates a change to a threshold relative to a current value of the threshold, as well as a type value (54) indicating a mobility threshold type to be changed and an absolute threshold value (56) to apply to the mobility threshold type. Once generated, the sending peer node (12a) sends (110) the mobility change request message (40) to a receiving peer node (12b).

22 Claims, 9 Drawing Sheets

(56) References Cited

U.S. PATENT DOCUMENTS

| | | | | |
|---|---|---|---|---|
| 2015/0296426 A1* | 10/2015 | Mildh | ............... | H04W 36/0055 455/436 |
| 2016/0021592 A1* | 1/2016 | Vesely | ............... | H04W 36/0072 370/331 |

OTHER PUBLICATIONS

ZTE, "The Event type related with HO trigger", 3GPP TSG-RAN3 Meeting #69, Madrid, Spain, Change Request 0378, Aug. 1, 2010, pp. 1-14, R3-102163, 3GPP.

Huawei, "Coordination of Mobility Setting Change", 3GPP TSG RAN WG3 #78, New Orleans, USA, Nov. 12, 2012, pp. 1-2, R3-122526, 3GPP.

Nokia Siemens Networks,"Mobility Setting Change procedure and misalignment of configuration", 3GPP TSG-RAN WG3 Meeting #78, New Orleans, USA, Nov. 12, 2012, pp. 1-2, R3-122502, 3GPP.

ZTE, "Enhancement on the Mobility Settings Change procedure", 3GPP TSG-RAN3 Meeting #66bis, Valencia, Spain, Change Request, Jan. 5, 2010, pp. 1-28, R3-100190, 3GPP.

3rd Generation Parnership Project, "3rd Generation Partnership Project; Technical Specification Group Radio Access Network; Evolved Universal Terrestrial Radio Access Network (E-UTRAN); S1 signalling transport (Release 11)", Technical Specification, 3GPP TS 36.412 V11.0.0, Sep. 1, 2012, pp. 1-8, 3GPP.

3rd Generation Parnership Project, "3rd Generation Partnership Project; Technical Specification Group Radio Access Network; Evolved Universal Terrestrial Radio Access Network (E-UTRAN); X2 signalling transport (Release 11)", Technical Specification, 3GPP TS 36.422 V11.0.0, Sep. 1, 2012, pp. 1-8, 3GPP.

3rd Generation Parnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.2.0, Sep. 1, 2012, pp. 1-136, 3GPP.

3rd Generation Partnership Project, "Digital cellular telecommunications system (Phase 2+); General Packet Radio Service (GPRS); Base Station System (BSS)—Serving GPRS Support Node (SGSN); BSS GPRS protocol (BSSGP)", Technical Specification, ETSI TS 148 018 V11.0.0 (3GPP TS 48.018 V11.0.0 Release 11), Oct. 1, 2012, pp. 1-187, ETSI.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.3.0, Sep. 1, 2012, pp. 1-205, 3GPP, France.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 11)", Technical Specification, 3GPP TS 36.413 V11.1.0, Sep. 1, 2012, pp. 1-262, 3GPP, France.

* cited by examiner

FIG. 1

PRIOR ART

FIG. 2

PRIOR ART

FIG. 3

| IE/Group Name | Presence | Range | IE Type and Reference | Semantics description | Criticality | Assigned Criticality |
|---|---|---|---|---|---|---|
| Message Type | M | | | | Yes | Reject |
| eNB1 Cell ID | M | | ECGI | | Yes | Reject |
| eNB2 Cell ID | M | | ECGI | | Yes | Reject |
| eNB1 Mobility Parameters | O | | Mobility Parameters Information | Configuration Change in $eNB_1$ cell | Yes | Ignore |
| eNB2 Proposed Mobility Parameters | M | | Mobility Parameters Information | Proposed Configuration Change in $eNB_2$ cell | Yes | Reject |
| Cause | M | | | | Yes | Reject |

FIG. 4

| IE/Group Name | Presence | Range | IE Type and Reference | Semantics description |
|---|---|---|---|---|
| Handover Trigger Change | M | | INTEGER (-20..20) | The actual value is IE value *0.5 dB. |

*FIG. 5*

Event A1 (Serving becomes better than threshold)
Event A2 (Serving becomes worse than threshold)
Event A3 (Neighbor becomes offset better than PCell)
Event A4 (Neighbor becomes better than threshold)
Event A5 (PCell becomes worse than threshold1 and neighbor becomes better than threshold2)
Event A6 (Neighbor becomes offset better than SCell)
Event B1 (Inter RAT neighbor becomes better than threshold)
Event B2 (PCell becomes worse than threshold1 and inter RAT neighbor becomes better than threshold2)

*FIG. 7*

| IE/Group Name | Presence | Range | IE Type and Reference | Semantics description |
|---|---|---|---|---|
| Handover Trigger Change | M | | INTEGER (-20 .. 20) | The actual value is IE value * 0.5 dB. |
| Handover Trigger Type | O | | Enumerated (ServingCell, NeighborCell, NeighborRelativePcell, NeighborRelativeScell,..) | |
| Handover Trigger New Value | O | | INTEGER | Absolute handover threshold value in dB. |
| Additional Handover Trigger Change | O | | INTEGER (-20 .. 20) | The actual value is IE value * 0.5 dB. |
| Additional Handover Trigger Type | O | | Enumerated (ServingCell, NeighborCell, NeighborRelativePcell, NeighborRelativeScell,..) | |
| Additional Handover Trigger New Value | O | | INTEGER | Absolute handover threshold value in dB. |
| Mobility Event Type | O | | Enumerated (A1, A2, A3, A4, A5, A6, B1, B2, ...) | Describes the mobility event for which mobility parameters are indicated |

*FIG. 6*

| IE/Group Name | Presence | Range | IE Type and Reference | Semantics description |
|---|---|---|---|---|
| Handover Trigger Change Lower Limit | M | | INTEGER (-20 .. 20) | The actual value is IE value * 0.5 dB. |
| Handover Trigger Type Upper Limit | M | | INTEGER (-20 .. 20) | The actual value is IE value * 0.5 dB. |
| Handover Trigger Type | O | | Enumerated (ServingCell, NeighborCell, NeighborRelativePcell, NeighborRelativeScell,..) | |
| Handover Trigger New Value | O | | INTEGER | Absolute handover threshold value in dB. |
| Additional Handover Trigger Change Lower Limit | O | | INTEGER (-20 .. 20) | The actual value is IE value * 0.5 dB. |
| Additional Handover Trigger Change Upper Limit | O | | INTEGER (-20 .. 20) | The actual value is IE value * 0.5 dB. |
| Additional Handover Trigger Type | O | | Enumerated (ServingCell, NeighborCell, NeighborRelativePcell, NeighborRelativeScell,..) | |
| Additional Handover Trigger New Value | O | | INTEGER | Absolute handover threshold value in dB. |
| Mobility Event Type | O | | Enumerated (A1, A2, A3, A4, A5, A6, B1, B2, ...) | Describes the mobility event for which mobility parameters are indicated |

METHODS FOR MOBILITY THRESHOLD SIGNALING

FIELD OF THE INVENTION

The present invention relates generally to wireless communications systems, and more particularly, to an apparatus and method of signaling mobility threshold changes between peer nodes in a communication network.

BACKGROUND

Figure 1:
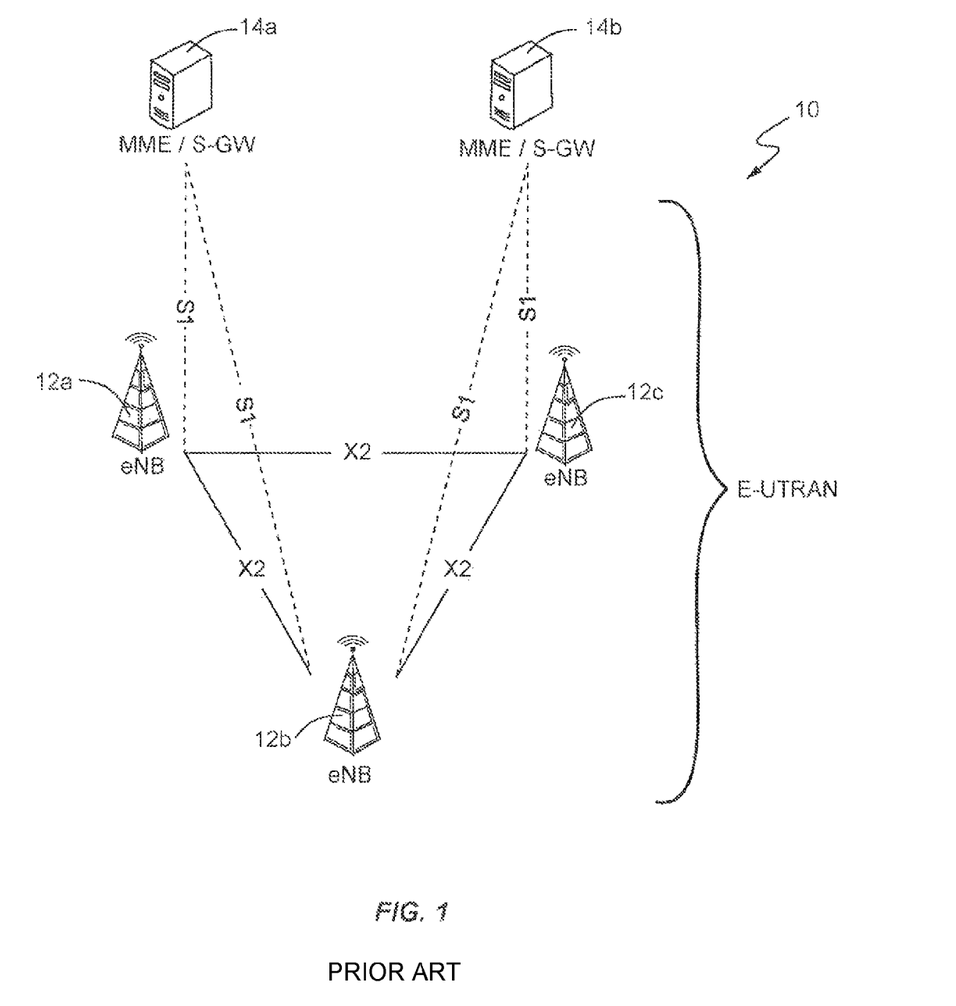
FIG. 1 is a block diagram illustrating an architecture for a Long Term Evolution (LTE) communications system.

The third generation partnership project (3GPP) is currently working on the further standardization of the Long Term Evolution (LTE) concept. This work targets the Evolved Universal Terrestrial Radio Access Network (E-UTRAN). The E-UTRAN system is part of the Evolved Packet System (EPS) which also includes the Evolved Packet Core (EPC). The architecture of the E-UTRAN system 10 is shown in FIG. 1, and includes radio access nodes or eNBs 12a, 12b, and 12c, collectively referred to as eNBs 12. FIG. 1 also illustrates evolved packet core nodes such as the Mobility Management Entities and Serving-Gateways (MME/S-GWs) 14a, 14b, collectively referred to as MME/S-GW 14. The interface between the eNBs 12 is referred to as an X2 interface, while the interface between the eNBs 12 and the MME/S-GWs 14 is referred to as an S1 interface. The signaling transport over the X2 and S1 interfaces are implemented via Stream Control Transmission Protocol (SCTP). Additional information regarding the 3GPP X2 and S1 signaling transport may be found in 3GPP TS 36.412 v. 11.0.0 entitled, "LTE; Evolved Universal Terrestrial Radio Access Network (E-UTRAN); S1 signaling transport," 3GPP TS 36.422 v. 11.0.0 entitled, "LTE; Evolved Universal Terrestrial Radio Access Network (E-UTRAN); X2 signaling transport," and in the Request for Comments RFC 4960 dated September 2007 and entitled, "Stream Control Transmission Protocol."

Figure 2:
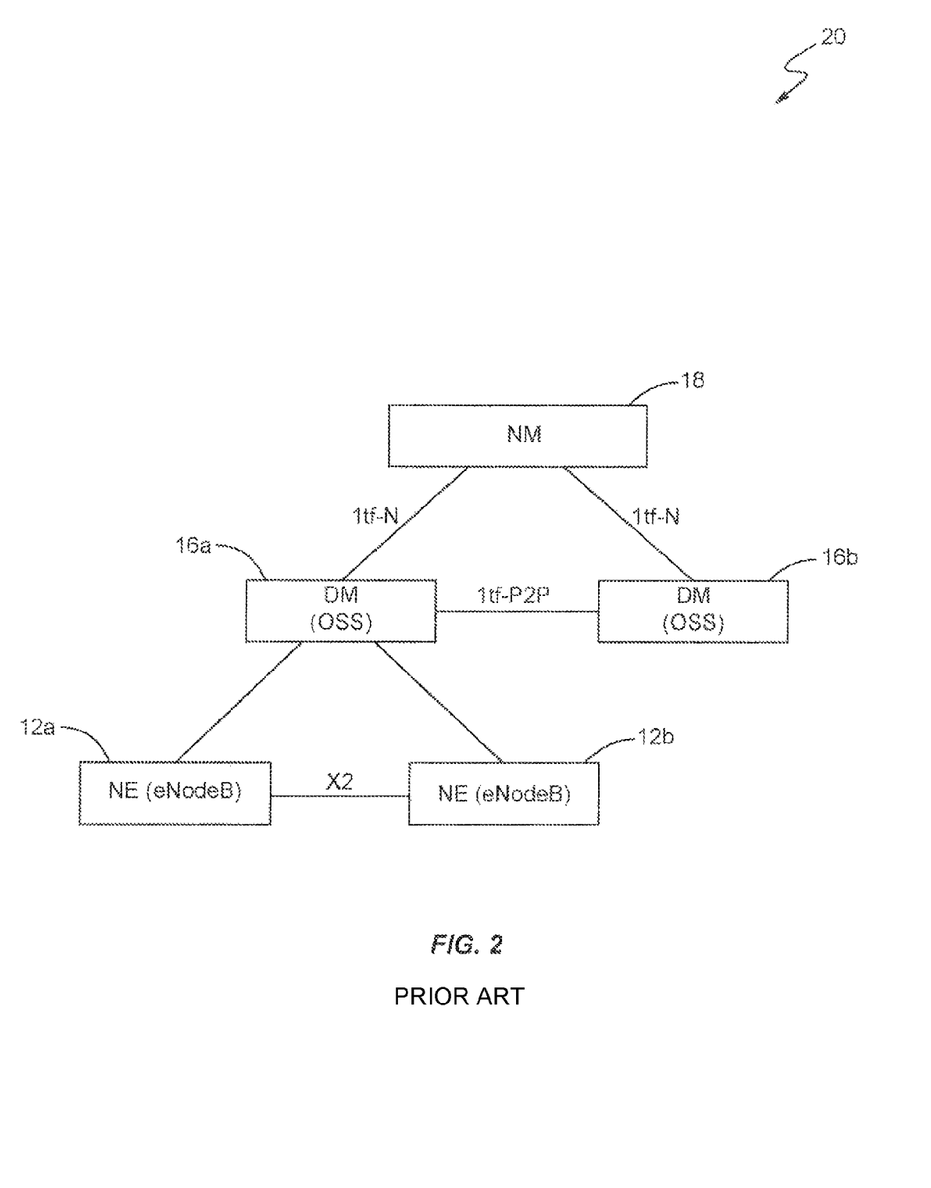
FIG. 2 is a block diagram illustrating a management system architecture for an LTE communications system.

FIG. 2 is a block diagram of an architecture for a management system 20 in such an LTE system. As seen in FIG. 2, the management system 20 comprises network elements (NEs), which are also referred to as eNodeBs or eNBs 12, domain managers (DMs) 16a and 16b, also referred to as the operation and support system (OSS) and collectively referred to as DMs 16, and a Network Manager 18. With the architecture, the eNBs 12 are managed by a DM 16. A DM 16 may further be managed by the NM 18 via an Itf-N interface. Two NEs, such as two eNBs 12a, 12b, are connected by an X2 interface, whereas the interface between two DMs 16 is referred to as Itf-P2P. The management system 20 may configure the eNBs 12a, 12b, as well as receive observations associated to features in the eNBs 12a, 12b. For example, the DM 16a observes and configures the eNBs 12a, 12b, while the NM 18 observes and configures the DMs 16, as well as the eNBs 12a, 12b via the DM 16a.

In recent discussions in the 3GPP, a number of solutions were presented to improve the Mobility Setting Change procedure described in the 3GPP Technical Specification (TS) 36.423 v. 11.4.0 dated April, 2013 and entitled "Evolved Universal Terrestrial Radio Access Network (E-UTRAN); X2 Application Protocol (X2AP)." The proposals were captured and described in documents R3-122502, "Mobility Setting Change Procedure and Misalignment of Configuration," and in R3-122526, "Coordination of Mobility Setting Change". Both proposals, which were discussed in 3GPP TSG-RAN WG3 Meeting #78 in New Orleans on Nov. 12-16, 2012, force the involvement of the Operations, Administration, and Management (OAM) systems serving each peer eNB 12 to configure default mobility parameters in each peer eNB 12, and to inform each peer eNB 12 of the default used by the peer eNB 12.

SUMMARY

Embodiments of the present disclosure provide an apparatus and method for communicating changes in mobility threshold values between peer eNBs in a communications network. More particularly, the present disclosure facilitates a synchronization of the absolute mobility thresholds between peer network nodes, such as eNBs, for example, by signaling the absolute threshold values between the peer network nodes. Additionally, a threshold type parameter that is used between a cell in the sending network node and in a cell in a peer network node is also signaled between the peer nodes.

Therefore, in one or more embodiments, the present disclosure provides a method for communicating mobility threshold changes between peer nodes in a communications network. In one embodiment, the method is performed at a sending peer node and comprises generating a mobility change request message to include an information element having a first set of mobility parameters. The first set of mobility parameters includes a first type value indicating a first mobility threshold type to be changed, and a first absolute threshold value to apply to the first mobility threshold type. Once generated, the sending peer node sends the mobility change request message to a receiving peer node.

In some embodiments, generating a mobility change request message further comprises generating the information element to have a second set of mobility parameters. The second set of mobility parameters comprises a second type value indicating a second mobility threshold type to be changed, and a second absolute threshold value to apply to the second mobility threshold type.

The first set of mobility parameters may, in one embodiment, further comprise a first change value to apply to a first trigger threshold. Additionally, the second set of mobility parameters may further comprise a second change value to apply to a second trigger threshold.

Further, the first set of mobility parameters indicates changes in one or more thresholds for a serving cell, while the second set of mobility parameters indicates changes in one or more thresholds for a neighbor cell. Additionally, in at least one embodiment, the information element further comprises a Mobility Event Type to specify a mobility event for which the first set of mobility parameters have been modified.

Generating the mobility change request message may include generating the mobility change request message responsive to determining that mobility parameter synchronization with the peer node has been lost.

In one embodiment, the present disclosure provides a sending peer node configured to communicate mobility threshold changes to a receiving peer node in a communications network.

Particularly, the sending peer node comprises a processing circuit and a communications circuit. The processing circuit is configured to generate a mobility change request message to include an information element having a first set of mobility parameters. The first set of mobility parameters comprises a first type value that indicates a first mobility threshold type to be changed, and a first absolute threshold value to apply to the first mobility threshold type. Once generated, the processing circuit is further configured to send the mobility change request message to a receiving peer node via the communications circuit.

In one embodiment, the processing circuit is further configured to generate the information element to also include a second set of mobility parameters. In one embodiment, the second set of mobility parameters comprises a second type value that indicates a second mobility threshold type to be changed, and a second absolute threshold value to apply to the second mobility threshold type.

In some embodiments, the processing circuit is further configured to configure the first set of mobility parameters to further comprise a first change value to apply to a first trigger threshold. Additionally, the second set of mobility parameters may further comprise a second change value to apply to a second trigger threshold.

In one embodiment, the processing circuit also configures the first set of mobility parameters to indicate a change in one or more thresholds for a serving cell, and configures the second set of mobility parameters to indicate a change in one or more thresholds for a neighbor cell.

In at least one embodiment, the processing circuit is further configured to generate the information element to include a Mobility Event Type parameter to specify a mobility event for which at least one of the first and second sets of mobility parameters have been modified.

In one embodiment, the processing circuit generates the mobility change request message responsive to determining that mobility parameter synchronization with the receiving peer node has been lost.

In addition, another embodiment of the present disclosure provides a method for communicating mobility threshold changes between peer nodes in a communications network. In this embodiment, the method is performed at a receiving peer node and comprises receiving a mobility change request message from a sending peer node, determining whether to change one or more mobility parameters based on information included with the mobility request message, and based on the determination, generating a mobility change failure message to include an information element having a first set of mobility parameters. The first set of mobility parameters comprise a first type value indicating a first mobility threshold type to be changed, and a first absolute threshold value to apply to the first mobility threshold type.

Generating a mobility change failure message may further comprise generating the information element to have a second set of mobility parameters. The second set of mobility parameters comprises a second type value indicating a second mobility threshold type to be changed, and a second absolute threshold value to apply to the second mobility threshold type.

In one embodiment, the information element further includes first and second pairs of upper and lower change limit threshold values. Further, the first set of mobility parameters indicates changes in one or more thresholds for a serving cell, while the second set of mobility parameters indicates changes in one or more thresholds for a neighbor cell.

In one embodiment, the information element further comprises a Mobility Event Type to specify a mobility event for which the first set of mobility parameters have been modified.

In another embodiment, the present disclosure provides a receiving peer node configured to communicate mobility threshold changes with a sending peer node in a communications network. In this embodiment, the receiving peer node comprises a communications circuit and a processing circuit. The processing circuit is configured to determine whether to change one or more mobility parameters based on information included with a mobility request message received from the sending peer node. Based on the determination, the processing circuit generates a reply message to include an information element having a first set of mobility parameters. This first set of mobility parameters in the reply message comprises a first type value indicating a first mobility threshold type to be changed, and a first absolute threshold value to apply to the first mobility threshold type.

In one embodiment, the processing circuit is further configured to generate the information element to also include a second set of mobility parameters. This second set of mobility parameters comprises a second type value indicating a second mobility threshold type to be changed, and a second absolute threshold value to apply to the second mobility threshold type.

In one embodiment, the information element may also comprise first and second pairs of upper and lower change limit threshold values. Further, in at least one embodiment, the processing circuit is further configured to configure the first set of mobility parameters to indicate a change in one or more thresholds for a serving cell. In some aspects, the second set of mobility parameters may be configured to indicate a change in one or more thresholds for a neighbor cell.

In one embodiment, the processing circuit may also be configured to generate the information element to include a Mobility Event Type configured to specify a mobility event for which at least one of the first and second sets of mobility parameters have been modified.

Of course, those skilled in the art will appreciate that the present disclosure is not limited to the above contexts or examples, and will recognize additional features and advantages upon reading the following detailed description and upon viewing the accompanying drawings.

DETAILED DESCRIPTION

The current standardized procedure for communicating mobility threshold changes between peer nodes, i.e., network-based nodes that are communicatively linked by an interface, such as, for example, eNBs linked by an X2 interface, in the 3GPP LTE system provides exchange of threshold changes relative to what was previously used.

Figure 5:
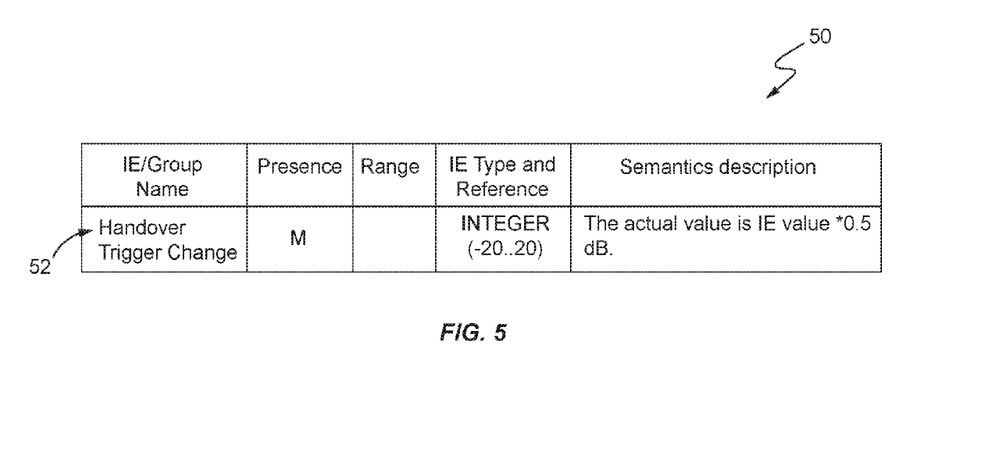
FIG. 5 is a table illustrating Mobility Parameters Information Information Element (IE) as defined in 3GPP TS 36.423.

The Mobility Parameters Information IE (seen later in FIGS. 5-6) contains the change of the Handover Trigger as compared to its current value. The value for the Handover Trigger corresponds to the threshold at which a cell initializes the handover preparation procedure towards a specific neighbor cell. A positive value for the change means the handover is proposed to take place later.

One drawback with the solution of communicating only relative changes is that if a mobility threshold is changed in one of the peer nodes (e.g., an eNB 12a), and is not communicated to the other peer node (e.g., another eNB 12b), there is no way to communicate the absolute threshold between the peer nodes to again achieve a state where the information is synchronized. Such situations may occur, for example, when operations staff changes a mobility threshold via the management system 20.

Another drawback with the current solution is that the type of mobility thresholds that are used cannot be communicated. Depending on the type of threshold used, the values signaled will have to be interpreted differently.

As stated above, recent discussions involving the 3GPP provided a number of solutions to improve the Mobility Settings Change procedure described in 3GPP TS 36.423. These proposals are described in R3-122502 and in R3-122526. The problem raised in these documents is that there could be cases in which two X2 connected peer eNBs 12, such as eNBs 12a, 12b, have lost synchronization with respect to the mobility threshold changes applied by each other. Namely, an eNB 12 such as eNB 12a may no longer know the handover trigger point of its peer eNB 12 such as eNB 12b. This problem cannot be resolved with an X2 Reset procedure because it was agreed in 3GPP that this procedure does not reset application layer parameters such as mobility parameters. Therefore, the two documents listed above propose to reuse the X2: Mobility Change Request message with both the $eNB_1$ Mobility Parameters IE and $eNB_2$ Proposed Mobility Parameters IE set to 0. Setting these parameters to 0 indicates to a peer eNB 12 (e.g., eNB 12b) that an anomalous situation of a synchronisation of mobility parameters has occurred.

Figure 3:
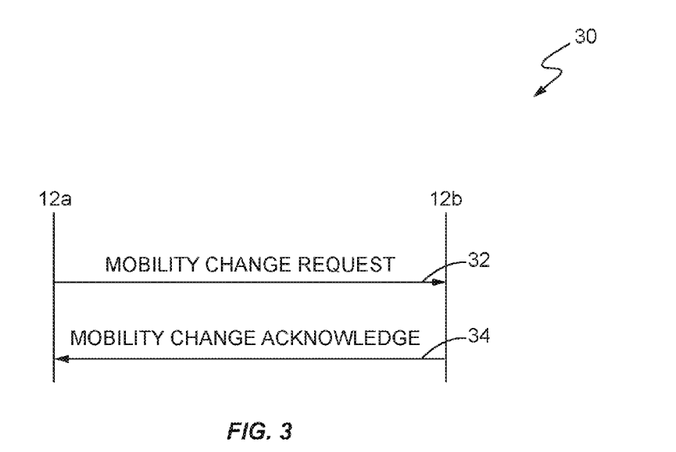
FIG. 3 is a signaling diagram illustrating mobility settings change messages being communicated between peer eNBs in an LTE communications system.
Figure 4:
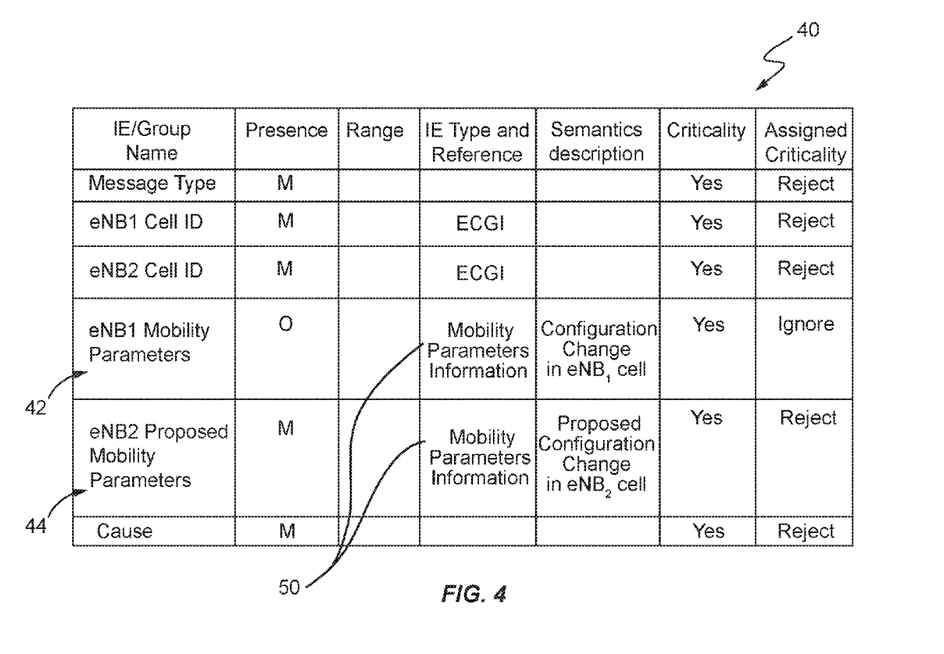
FIG. 4 is a table illustrating a Mobility Change Request message.

More specifically, FIG. 3 is a signaling diagram illustrating an exchange of an X2: Mobility Change Request message and corresponding Mobility Change Acknowledgement message between two peer eNBs 12a, 12b. Particularly, the sending peer eNB 12a sends a Mobility Change Request message to the receiving peer eNB 12b (line 32), which then returns a Mobility Change Acknowledgement message to the sending peer eNB 12a (line 34). FIG. 4 is a table illustrating the parameters of the X2: Mobility Change Request message 40 sent by the sending peer eNB 12a as those parameters are currently proposed in R3-122502. Specifically, as seen in FIG. 4, R3-122502 currently calls for setting the $eNB_1$ Mobility Parameters IE 42 and the $eNB_2$ Proposed Mobility Parameters IE 44 to 0 in a Mobility Change Request message 40. This implies a reset of the mobility parameters of the cell served by the sending peer eNB 12a to a default value pre-configured via the OAM system (line 32). The receiving peer eNB 12b receiving this message might return the Mobility Change Acknowledgment message back to the sending eNB 12a (line 34), and react to the received message by resetting its mobility parameters as well.

As for R3-122526, it currently proposes that the X2: Mobility Change Request message 40, with the $eNB_1$ Mobility Parameters IE 42 and $eNB_2$ Proposed Mobility Parameters IE 44 set to 0, is interpreted by the receiving eNB 12b as an inquiry of the offset of the current mobility parameters used by target cell with respect to a default value pre-configured via OAM. In both of these prior art solutions, there is the need for the OAM system(s) to configure default mobility parameters in each peer eNB 12a, 12b and to inform each peer eNB 12a, 12b of the default used by the other of the peer eNBs 12a, 12b.

In order to make the Mobility Setting Change procedure fully contained within the Radio Access Network (RAN) system, it would be desirable to design a solution that does not necessarily need involvement of the OAM. The reason for this is that each peer eNB 12a, 12b might have its own OAM system (since OAM systems are vendor specific), and therefore, a multi OAM deployment would require communication between OAM systems in order to inform peer eNBs 12a, 12b about the default mobility parameters adopted by the peer eNB cells. Additionally, the solutions proposed in the prior art do not address the issue of which mobility event the handover parameters are changed for.

Therefore, the present disclosure provides an apparatus and method for facilitating the synchronization of the absolute mobility thresholds between peer network nodes, such as peer eNBs 12a, 12b, by signaling the absolute threshold values between the peer network nodes. In addition, the apparatus and method of the present disclosure signals a threshold type between the peer network nodes to communicate the threshold type that is used between a cell associated with the sending peer node 12a and associated with a cell in a receiving peer node 12b.

It should be noted here that the 3GPP LTE network is used as example when describing the added information in the mobility threshold information exchange. However, those skilled in the art will appreciate that the present disclosure is not so limited, and that the system and methods presented herein may be utilized in other communication networks as well. The Mobility Change Request message 40 is defined as in FIG. 4 and includes the Mobility Parameters Information Element (IE) 50 (see FIG. 5). The current Mobility Parameters Information IE contains only one parameter—the change of the mobility threshold 52 (see FIG. 5) compared to the current value. However, the type of threshold that the change is applied to is not transferred in the Mobility Parameters IE. The current value of the threshold is also not transferred in the Mobility Change Request message 40.

Figure 6:
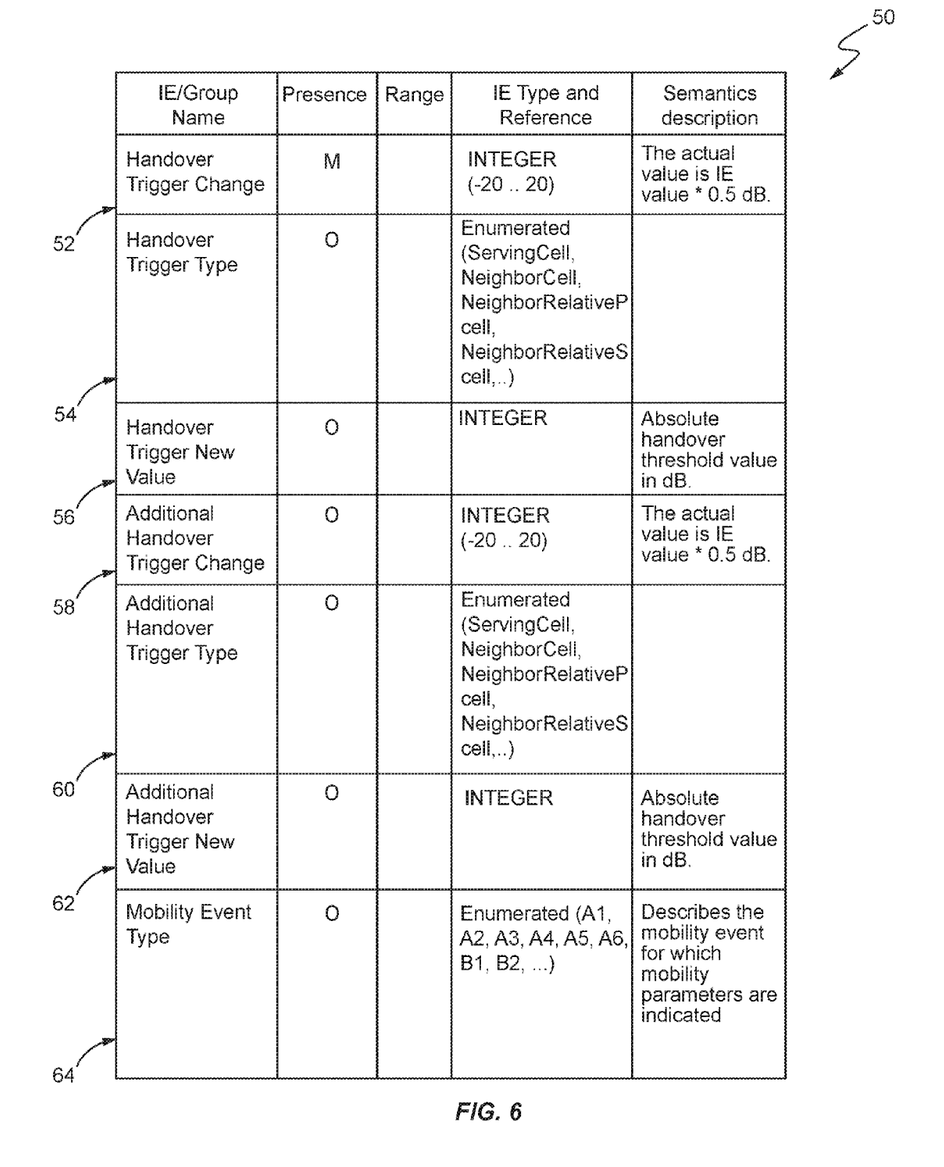
FIG. 6 is a table illustrating a Mobility Parameters Information Element (IE) according to one embodiment of the present disclosure.

Therefore, as seen in FIG. 6 and in accordance with one embodiment of the present disclosure, the Mobility Parameters Information IE 50 is extended to include a mobility threshold type parameter (i.e., Handover Trigger Type 54) and a threshold absolute value parameter (i.e., Handover Trigger New Value 56).

Figure 7:
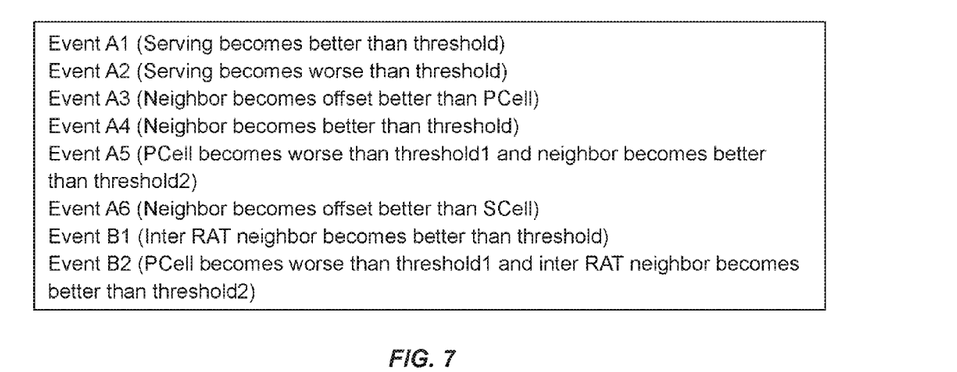
FIG. 7 is a table of events describing different triggering criteria defined in 3GPP TS 36.331.

The addition of the Handover Trigger Type parameter 54 makes it possible to distinguish between mobility thresholds for the serving cell signal, for the target cell signal, and for the relative difference between source and target cell. It also makes clear, for the case of carrier aggregation, if the relative threshold is between neighbor cell and primary serving or secondary serving cell. The addition of the second additional set of Change, Type and New Values (i.e., the Additional Handover Trigger Change parameter 58, the Additional Handover Trigger Type parameter 60, and the Additional Handover Trigger New Value parameter 62) makes it possible to indicate the thresholds changes for both serving and neighbor cell in one message. Namely, the two sets of Change parameters (52, 58), Type parameters (54, 60), and New Value parameters (56, 62), allow the signaling of changes on a serving cell and target cell signal threshold in case of, for example, mobility events based on two thresholds. Such mobility events are illustrated, by way of example, in FIG. 7.

Optionally, the Mobility Change Request message 40 may be enhanced to further comprise a Mobility Event Type parameter 64 to specify the particular mobility event for which the mobility parameters have been modified or indicated. The new parameters (i.e., parameters 54-62) are included, if applicable, when the Mobility Parameters Information IE 50 is used as eNB$_1$ Mobility Parameters 42 in the Mobility Change Request message 40, but may also be included when used as eNB$_2$ Proposed Mobility Parameters 44 in the same message 40. Additionally, the inclusion of the Handover Trigger New Value parameter 56, i.e. the absolute handover threshold value in dB, may be used and interpreted as an indication that the current mobility parameters settings are creating mobility problems and that a reset to a default value is needed. The default value used by a sending eNB 12a does not need to be known by the receiving peer eNB 12b because, in case the sending eNB 12a decides to default to the value, it will transmit that value in the Handover Trigger New Value parameter 56. Hence the two peer eNBs 12a, 12b can be immediately aware of the absolute threshold to which each of them defaulted to as a consequence of, e.g., loss of mobility parameters information synchronization or identification of mobility problems attributed to wrong mobility parameters setting.

The network node that receives the Mobility Change Request Message 40 with the Mobility Parameters IE 50 may not be able, or required, to perform the proposed change in its own parameters. In this case, the receiving peer eNB 12b answers the sending peer eNB 12a with a reply message, such as a Mobility Change Failure message. It is currently possible to indicate only one set of lower and upper limits for changes to the proposed parameters values. Thus, there is no current way to indicate which parameter for which the limits are valid. Nor is it possible to send more than this one set of lower and upper limits.

Figure 8:
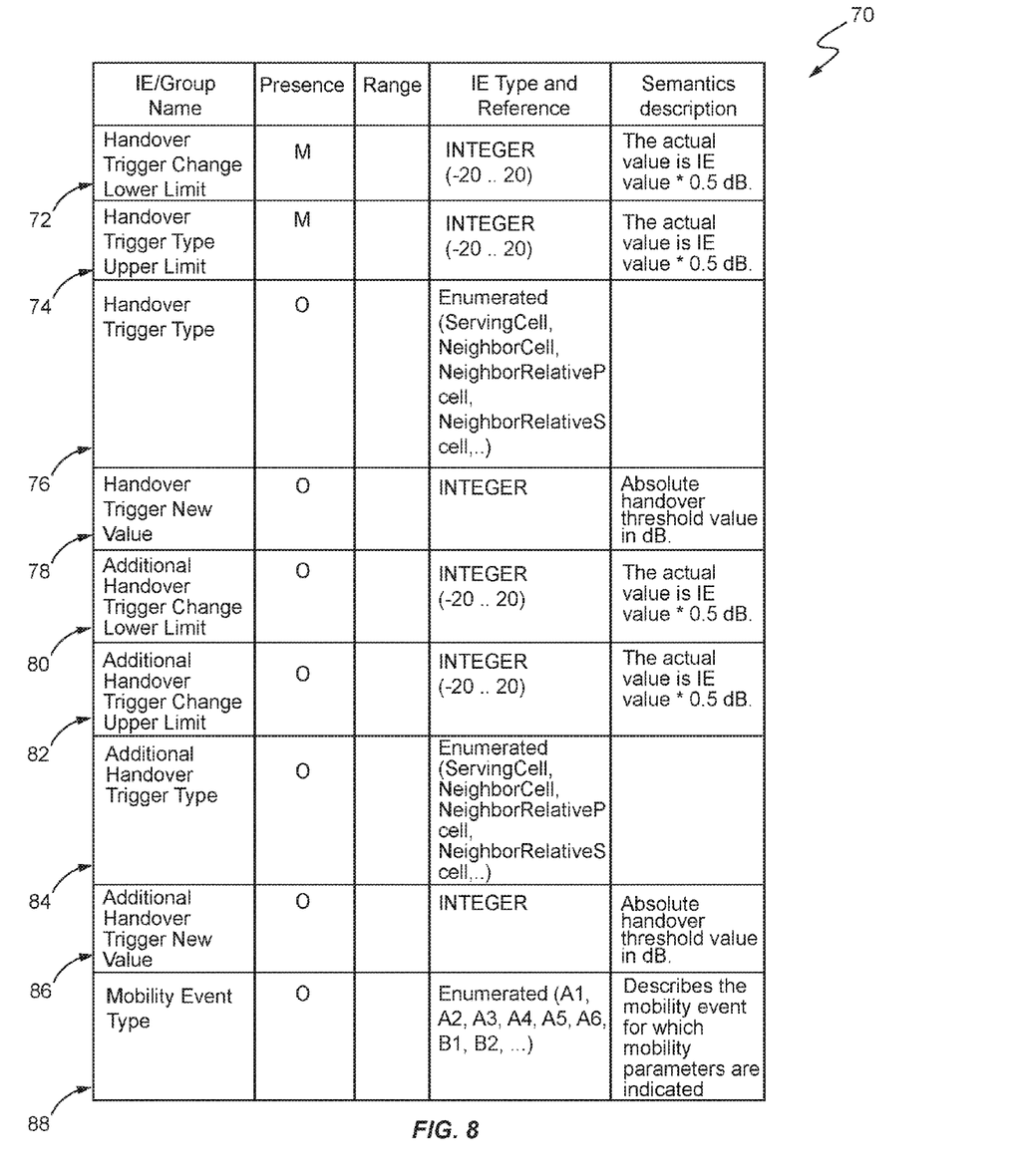
FIG. 8 is a table illustrating a Mobility Parameters Modification Range Information Element (IE) according to one embodiment of the present disclosure.

Therefore, according to one embodiment seen in FIG. 8, the Mobility Parameters Modification Range IE 70 is extended to include additional fields of information. Particularly, in addition to the Handover Trigger Change Lower and Upper Limit parameters 72, 74, the Mobility Parameters Modification Range IE 70 is extended to include a Handover Trigger Type parameter 76, a Handover Trigger New Value parameter 78, and a second set of information (i.e., an Additional Handover Trigger Change Lower Limit parameter 80, an Additional Handover Trigger Change Upper Limit parameter 82, an Additional Handover Trigger Type parameter 84, and an Additional Handover Trigger New Value parameter 86) to correspond to the extension of the Mobility Parameters Information IE 50. Additionally the Mobility Parameters Modification Range IE 70 is also extended to include a Mobility Event Type parameter 88 for which the indicated thresholds and ranges apply.

The previously detailed embodiments provide just one example of how to implement the current disclosure. However, the present disclosure is not limited solely to these methods. In another embodiment, the Mobility Change Request and Mobility Change Failure messages are extended to include new IEs that comprise information corresponding to the introduced parameters instead of extending the existing IEs as previously described. Regardless, however, in any embodiment, the additional information should inform a receiving peer eNB 12b of the absolute value of the threshold used by a sending peer eNB 12a for a specific cell, as well as the different absolute and relative changes of different thresholds involved in different mobility events.

It should be noted here that the previous embodiments describe aspects of the disclosure in the context of an LTE system such that the messages are sent directly between the peer nodes over the X2 interface. However, the present disclosure is not so limited. In other embodiments, the messages are sent via other intermediate nodes, and also between nodes in different networks using different radio access technologies (RAT). One example of such Inter RAT signaling may involve the use of the RAN Information Management (RIM) protocol (3GPP TS 48.018 V11.1.0, Base Station System (BSS)—Serving GPRS Support Node (SGSN); BSS GPRS Protocol (BSSGP)) for signaling the new information, and it may involve an LTE eNB and an UTRAN Radio Network Controller (RNC) as the peer nodes exchanging information concerning the modified Inter RAT mobility parameters.

Figure 9:
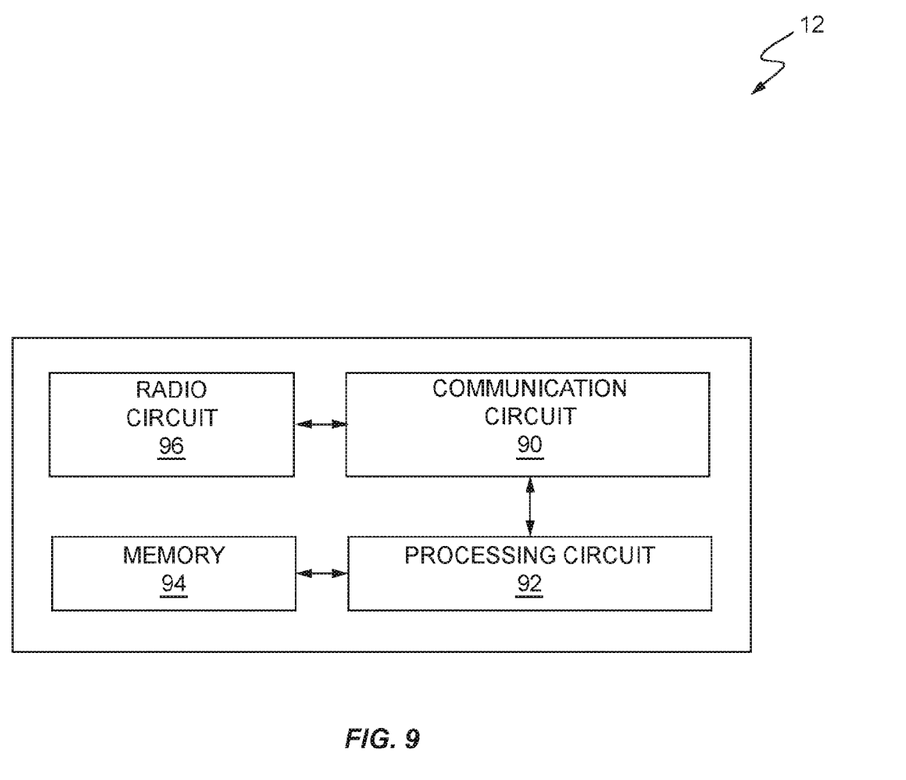
FIG. 9 is a block diagram illustrating some of the components of a wireless node configured to perform the method of the disclosure according to one or more embodiments.

The present disclosure may be performed by a network node such as an eNB 12, for example, seen in the functional block diagram of FIG. 9.

As seen in FIG. 9, the eNB 12 comprises a communication circuit 90, a processing circuit 92, a memory 94, and a radio circuit 96. Those of ordinary skill in the art will readily appreciate that other components, such as a user interface (not shown) and/or a display (not shown), for example, may or may not be included with the eNB 12.

The communication circuit 90 is configured to send and receive S1 messages and X2 messages over the logical S1 and X2 interfaces, respectively. Such messages include, but are not limited to, the messages carrying the enhanced Information Elements previously described. The memory 94 may comprise any solid state memory or computer readable media known in the art. Suitable examples of such media include, but are not limited to, Read Only Memory (ROM), Dynamic Random Access Memory (DRAM), Flash memory, or a device capable of reading computer-readable media, such as optical or magnetic media. In one or more embodiments of the present disclosure, the memory circuit 94 is configured to store information about neighbor cells, cell relations, mobility thresholds, and peer nodes in the network, such as other eNBs 12.

The radio circuit 96 is configured to communicate with one or more pieces of User Equipment (UE), and thus, may comprise a transmitter and receiver configured to operate in an LTE system or other similar system. As is known in the art, the transmitter and receiver are coupled to one or more antennas (not shown) to communicate signals and data with the UEs over the air interface.

The processing circuit 92 controls the operation of the eNB 12 in accordance with the LTE standard. The functions of the processing circuit 92 may be implemented by one or more microprocessors, hardware, firmware, or a combination thereof, and be configured to perform the functions previously described. Thus, the processing circuit 92 may be configured, according to logic and instructions stored in memory, to communicate with the UEs, and to provide information to, and retrieve information from, the messages communicated over the X2 and/or the S1 interfaces using the methods previously described. In any event, the processing circuit 92 is configured to control the eNB 12 to signal the absolute threshold values and the threshold type information (i.e., fields 54-64 in the extended Mobility Parameters Information IE 50 and fields 76-88 in the extended Mobility Parameters Modification Range IE 70), to other peer eNBs 12 as previously described.

Figure 10:
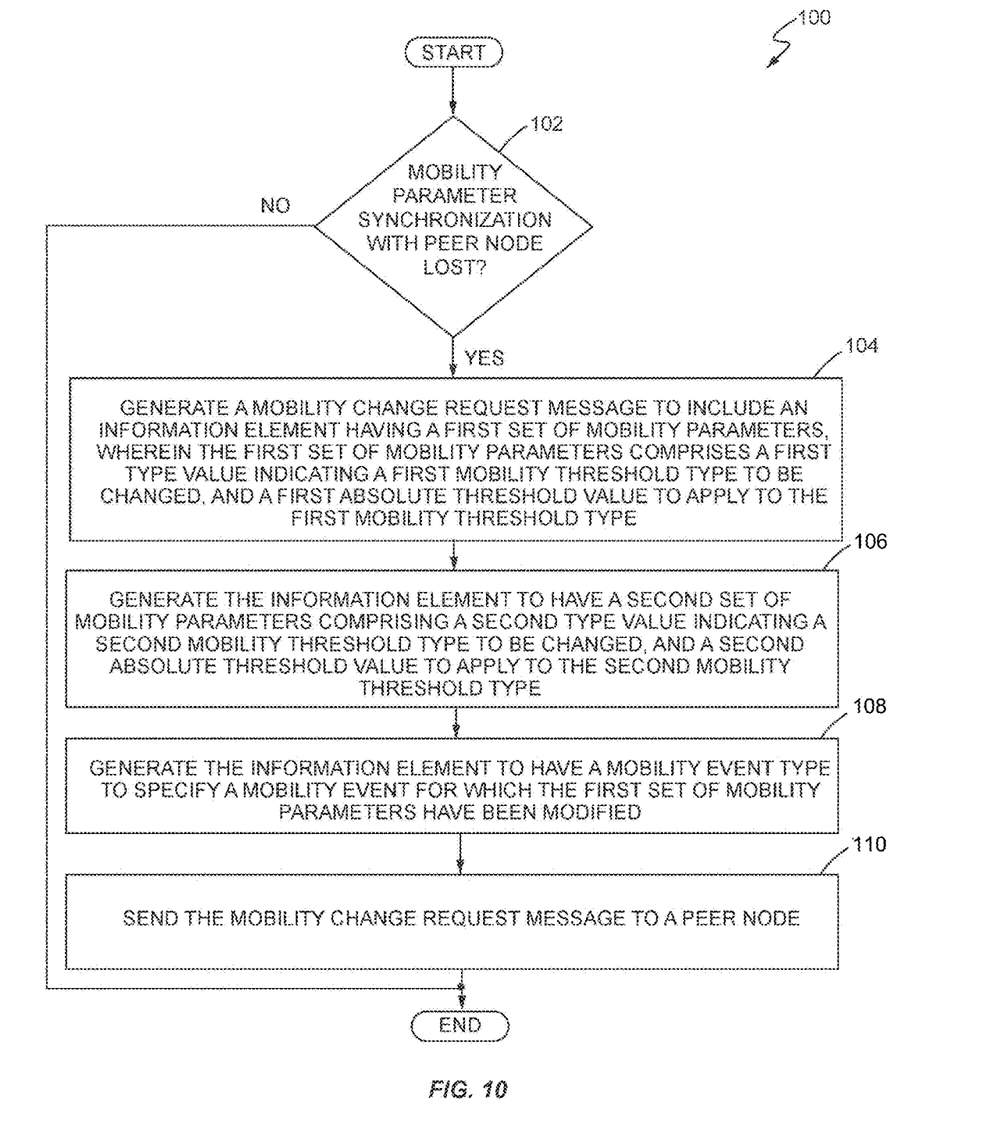
FIG. 10 is a flow diagram illustrating a method for communicating changes in mobility threshold values between peer eNBs according to one embodiment of the present disclosure.

FIG. 10 is a flow diagram illustrating a method 100 for communicating mobility threshold changes from a sending eNB 12a to a receiving eNB 12b in a communications network. Method 100 is performed at the sending eNB 12a and begins with the sending eNB 12a checking to determine whether it has lost mobility parameter synchronization with the receiving eNB 12b (box 102). If synchronization is not lost, the method 100 ends. Otherwise, the sending eNB 12a generates a mobility change request message, such as Mobility Change Request message 40, for example, to include an information element (box 104).

In this embodiment, the information element is generated to comprise the Mobility Parameters Information IE 50. As previously described, the Mobility Parameters Information IE 50 comprises a first set of mobility parameters having a first type value 54 to indicate a first mobility threshold type to be changed, and a first absolute threshold value 56 to apply to the first mobility threshold type. Additionally, as stated above, the first set of mobility parameters may also have a first change value 52 to apply to a first trigger threshold, and be configured to indicate a change in one or more thresholds for a serving cell.

The method 100 may further comprise the sending eNB 12a generating the Mobility Parameters Information IE 50 to include a second set of mobility parameters (box 106). In this embodiment, the second set of mobility parameters comprises a second type value 60 that indicates a second mobility threshold type to be changed, and a second absolute threshold value 62 to apply to the second mobility threshold type. However, as stated above, the second set of mobility parameters may also be generated to comprise a second change value 58 to be applied to a second trigger threshold, and be configured to indicate a change in one or more thresholds for a neighbor cell.

In addition, the sending eNB 12a may generate the Mobility Parameters Information IE 50 to include a Mobility Event Type 54 (box 108). The Mobility Event Type 64 specifies a mobility event for which at least one of the first and second sets of mobility parameters have been modified. Once generated, the sending eNB 12a sends the Mobility Change Request message 40 to the receiving eNB 12b (box 110) via the previously identified X2 interface.

Figure 11:
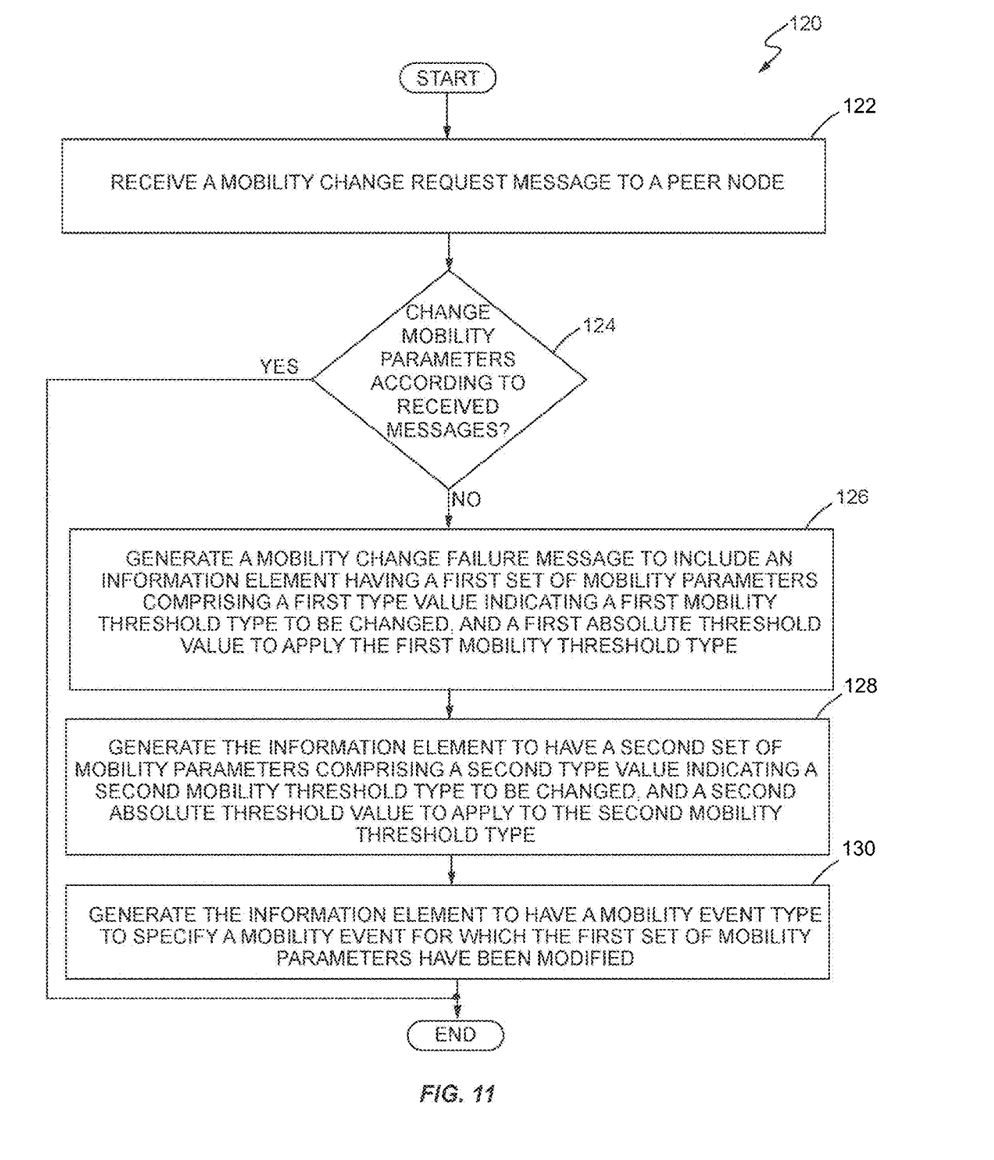
FIG. 11 is a flow diagram illustrating a method for communicating changes in mobility threshold values between peer eNBs according to another embodiment of the present disclosure.

FIG. 11 is a flow diagram illustrating a method 120 for communicating mobility threshold changes from a receiving eNB 12b to a sending eNB 12a in the communications network 10. Method 120 is performed at the receiving eNB 12b and begins with the receiving eNB 12b receiving a mobility change request message (e.g., Mobility Change Request message 40) from the sending eNB (12a) (box 122). Upon receipt, the receiving eNB 12b determines whether to change one or more mobility parameters based on information included with the mobility change request message (box 124). If the receiving eNB 12b decides not to change one or more of the parameters in accordance with the received Mobility Change Request message, the receiving eNB 12b will generate a reply message to include an information element, such as the previously identified Mobility Parameters Modification Range IE 70, for example, having a first set of mobility parameters (box 126).

As previously described, the first set of mobility parameters may be configured to indicate a change in one or more thresholds for a serving cell, and thus, may comprise a first type value 76 indicating a first mobility threshold type to be changed, and a first absolute threshold value 78 to apply to the first mobility threshold type. Additionally, the first set of mobility parameters may comprise a first pair of lower and upper change limit threshold values 72, 74.

In one embodiment, the receiving eNB 12b generates the Mobility Parameters Modification Range IE 70 to include a second set of mobility parameters to indicate a change in one or more thresholds for a neighbor cell (box 128). To that end, the second set of mobility parameters may comprise a second type value 84 indicating a second mobility threshold type to be changed, and a second absolute threshold value 86 to apply to the second mobility threshold type. Additionally, in at least one embodiment, the receiving eNB 12b may generate the Mobility Parameters Modification Range IE 70 to include a Mobility Event Type 88 (box 130).

As previously described, the Mobility Event Type 88 is configured to specify a mobility event for which at least one of the first and second sets of mobility parameters has been modified. Once generated, the receiving eNB 12b returns the Mobility Parameters Modification Range IE 70 in the reply message to the sending eNB 12a.

The apparatus and method of the present disclosure provide advantages and benefits that conventional apparatuses and methods do not realize. Particularly, in one or more embodiments, it is possible to optimize the mobility parameters in cases where changes to the parameters in peer network nodes have caused the parameters to become unsynchronized. Further, with the present disclosure, there is no need for support from external systems, such as operation, administration, and maintenance (OAM) systems. Additionally, it is possible with the present disclosure to inform peer nodes of what type of threshold that has been changed.

The present disclosure may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

We claim:

1. A method, performed at a sending peer node, for communicating mobility threshold changes to a receiving peer node in a communications network, the method comprising:
   generating a mobility change request message that includes an information element having a first set of mobility parameters, the first set of mobility parameters comprising:
   a first type value indicating a first mobility threshold type to be changed; and
   a first absolute threshold value to apply to the first mobility threshold type;
   sending the mobility change request message to the receiving peer node.

2. The method of claim 1, wherein generating a mobility change request message further comprises generating the information element so as to include a second set of mobility parameters, the second set of mobility parameters comprising:

a second type value indicating a second mobility threshold type to be changed; and
a second absolute threshold value to apply to the second mobility threshold type.

3. The method of claim 2, wherein:
the first set of mobility parameters further comprises a first change value to apply to a first trigger threshold;
the second set of mobility parameters further comprises a second change value to apply to a second trigger threshold.

4. The method of claim 2, wherein:
the first set of mobility parameters is configured to indicate a change in one or more thresholds for a serving cell;
the second set of mobility parameters is configured to indicate a change in one or more thresholds for a neighbor cell.

5. The method of claim 2, wherein the information element further comprises a Mobility Event Type to specify a mobility event for which at least one of the first and second sets of mobility parameters have been modified.

6. The method of claim 1, wherein generating the mobility change request message comprises generating the mobility change request message responsive to determining that mobility parameter synchronization with the receiving peer node has been lost.

7. A sending peer node configured to communicate mobility threshold changes to a receiving peer node in a communications network, the sending peer node comprising:
a processing circuit configured to:
generate a mobility change request message that includes an information element having a first set of mobility parameters, the first set of mobility parameters comprising:
a first type value indicating a first mobility threshold type to be changed, and
a first absolute threshold value to apply to the first mobility threshold type;
send the mobility change request message to the receiving peer node.

8. The sending peer node of claim 7, wherein the processing circuit is further configured to generate the information element so as to include a second set of mobility parameters, the second set of mobility parameters comprising:
a second type value indicating a second mobility threshold type to be changed; and
a second absolute threshold value to apply to the second mobility threshold type.

9. The sending peer node of claim 8, wherein the processing circuit is further configured to configure:
the first set of mobility parameters to further comprise a first change value to apply to a first trigger threshold;
the second set of mobility parameters further comprise a second change value to apply to a second trigger threshold.

10. The sending peer node of claim 8, wherein the processing circuit is further configured to configure:
the first set of mobility parameters to indicate a change in one or more thresholds for a serving cell;
the second set of mobility parameters to indicate a change in one or more thresholds for a neighbor cell.

11. The sending peer node of claim 8, wherein the processing circuit is further configured to generate the information element so as to include a Mobility Event Type to specify a mobility event for which at least one of the first and second sets of mobility parameters have been modified.

12. The sending peer node of claim 7, wherein the processing circuit is further configured to generate the mobility change request message responsive to determining that mobility parameter synchronization with the receiving peer node has been lost.

13. A method, performed at a receiving peer node, for communicating mobility threshold changes with a sending peer node in a communications network, the method comprising:
receiving a mobility change request message from the sending peer node;
determining whether to change one or more mobility parameters based on information included with the mobility request message;
based on the determination, generating a reply message that includes an information element having a first set of mobility parameters, the first set of mobility parameters comprising:
a first type value indicating a first mobility threshold type to be changed; and
a first absolute threshold value to apply to the first mobility threshold type.

14. The method of claim 13, wherein the generating a reply message comprises generating the information element so as to have a second set of mobility parameters, the second set of mobility parameters comprising:
a second type value indicating a second mobility threshold type to be changed;
a second absolute threshold value to apply to the second mobility threshold type.

15. The method of claim 13, wherein the information element further comprises first and second pairs of upper and lower change limit threshold values.

16. The method of claim 14, wherein
the first set of mobility parameters is configured to indicate a change in one or more thresholds for a serving cell; and
the second set of mobility parameters is configured to indicate a change in one or more thresholds for a neighbor cell.

17. The method of claim 14, wherein the information element further comprises a Mobility Event Type configured to specify a mobility event for which at least one of the first and second sets of mobility parameters have been modified.

18. A receiving peer node configured to communicate mobility threshold changes with a sending peer node in a communications network, the receiving peer node comprising:
a processing circuit configured to:
determine whether to change one or more mobility parameters based on information included with a mobility request message received from the sending peer node;
based on the determination, generate a reply message that includes an information element having a first set of mobility parameters, the first set of mobility parameters comprising:
a first type value indicating a first mobility threshold type to be changed; and
a first absolute threshold value to apply to the first mobility threshold type.

19. The receiving peer node of claim 18, wherein the processing circuit is further configured to generate the information element so as to have a second set of mobility parameters, the second set of mobility parameters comprising:

a second type value indicating a second mobility threshold type to be changed, and a second absolute threshold value to apply to the second mobility threshold type.

20. The receiving peer node of claim 18, wherein the information element further comprises first and second pairs of upper and lower change limit threshold values.

21. The receiving peer node of claim 19, wherein the processing circuit is further configured to configure:

the first set of mobility parameters to indicate a change in one or more thresholds for a serving cell;

the second set of mobility parameters to indicate a change in one or more thresholds for a neighbor cell.

22. The receiving peer node of claim 19, wherein the processing circuit is further configured to generate the information element so as to include a Mobility Event Type configured to specify a mobility event for which at least one of the first and second sets of mobility parameters have been modified.

* * * * *